United States Patent [19]
Link et al.

[11] 3,850,449
[45] Nov. 26, 1974

[54] ANTIJACKKNIFING DEVICE

[76] Inventors: James H. Link, 712 S. Broadway, St. Louis, Mo. 63102; Jess L. Watts, 10027 Schuessler Rd., St. Louis, Mo. 63128

[22] Filed: Mar. 19, 1973

[21] Appl. No.: 342,687

[52] U.S. Cl............ 280/432, 280/438 A, 280/446 B
[51] Int. Cl...................... B62d 53/06, B62d 53/00
[58] Field of Search............ 280/432, 446 B, 438 A

[56] References Cited
UNITED STATES PATENTS

| | | | |
|---|---|---|---|
| 2,468,705 | 4/1949 | Price | 280/432 |
| 2,709,088 | 5/1955 | Orbits | 280/432 |
| 3,722,920 | 3/1973 | Reese | 280/446 B |

FOREIGN PATENTS OR APPLICATIONS

| | | | |
|---|---|---|---|
| 555,822 | 3/1957 | Belgium | 280/432 |
| 556,844 | 5/1958 | Canada | 280/432 |

Primary Examiner—Leo Friaglia
Attorney, Agent, or Firm—F. Travers Burgess

[57] ABSTRACT

An anti-jackknifing device for road vehicle motor and trailer sets comprises a link of variable length connecting points on both vehicles spaced from the pivot axis of the motor to trailer coupling and lockable to prevent elongation and thus prevent further pivoting during situations in which jackknifing might be imminent. The link is preferably a fluid cylinder and piston assembly including a normally open one-way valve closable responsive to vehicle brake application, and to manual actuation to prevent pivotal movements of the motor and trailer vehicles with respect to each other.

11 Claims, 8 Drawing Figures

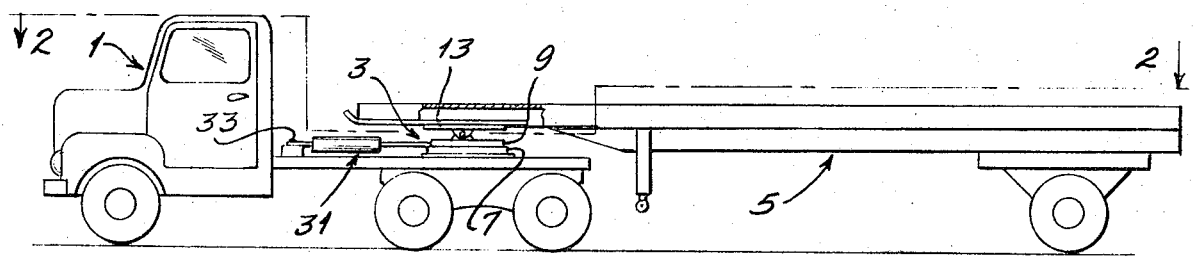
FIG.1
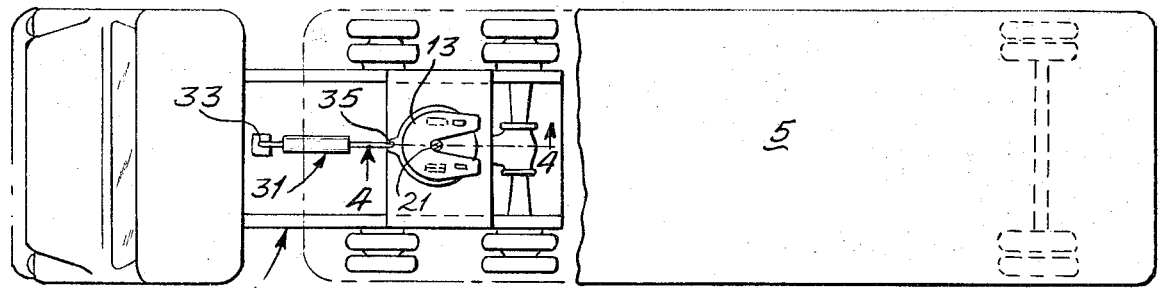
FIG.2
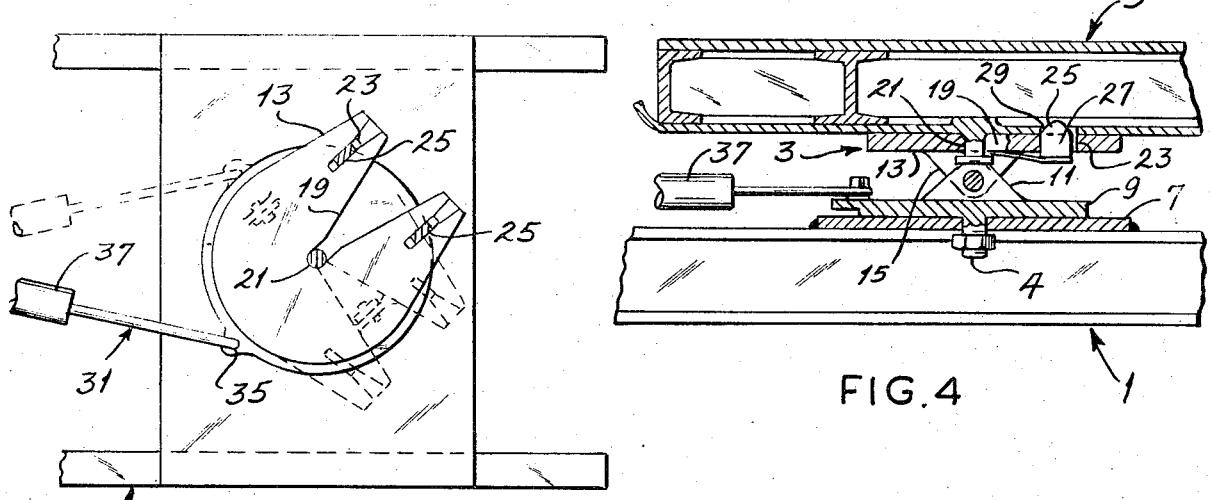
FIG.3
FIG.4
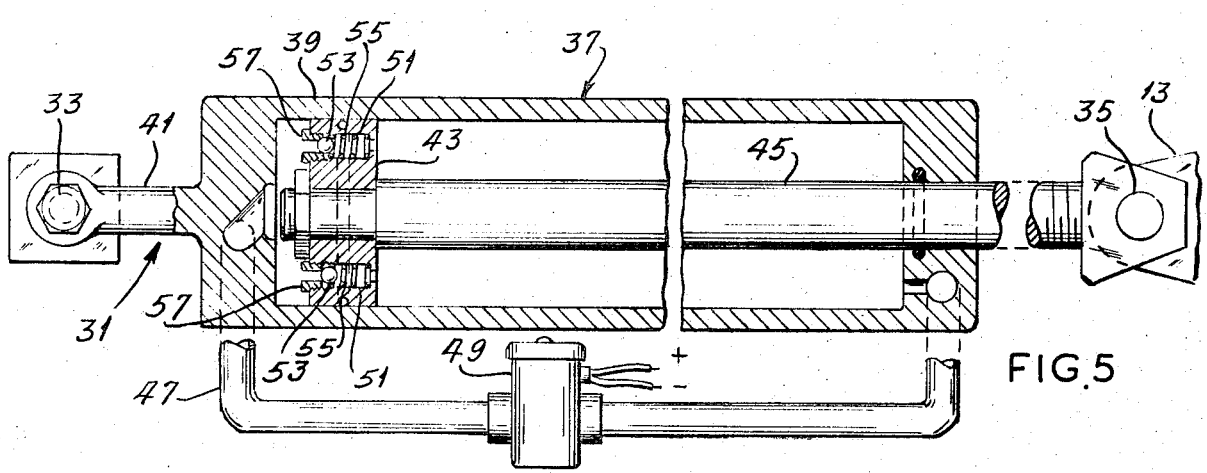
FIG.5

ANTIJACKKNIFING DEVICE

BACKGROUND OF THE INVENTION

1. Field of the Invention

The invention relates to articulated road vehicles and consists particularly in an anti-jackknifing device for motor and trailer combination vehicles.

2. The Prior Art

Various attempts have been made to prevent jackknifing by articulated highway vehicles, such as the provision of stop lugs for limiting relative movement of the units forming such vehicles. Such means have generally been unsuccessful.

SUMMARY OF THE INVENTION

The invention provides a simple relatively inexpensive yet reliable and effective means for preventing jackknifing between a highway motor and trail vehicle coupled to each other. Objects of the invention include the provision of such means which are normally inoperative except during brake applications or when desired by the driver so as not to interfere with normal turning movements, the provision for making it selectively operable under the driver's control whenever he judges jackknifing to be imminent, the provision of such means that will not resist return of the motor and trail vehicles toward their normal aligned relationship even when the means is operative to resist movements of the vehicles away from alitned relationship.

BRIEF DESCRIPTION OF THE DRAWINGS

FIG. 1 is a side elevational view of a tractor-semitrailer combination vehicle, partly broken away to show a device embodying the invention.

FIG. 2 is a fragmentary plan view of the vehicle of FIG. 1, with the trailer body partly broken away to show the invention.

FIG. 3 is an enlarged fragmental plan view of the device illustrated in FIGS. 1 and 2.

FIG. 4 is a fragmentary longitudinal vertical elevational view along line 4—4 of FIG. 2.

FIG. 5 is a longitudinal vertical sectional view of the variable length operating link.

DETAILED DESCRIPTION OF THE INVENTION

Figure 6:
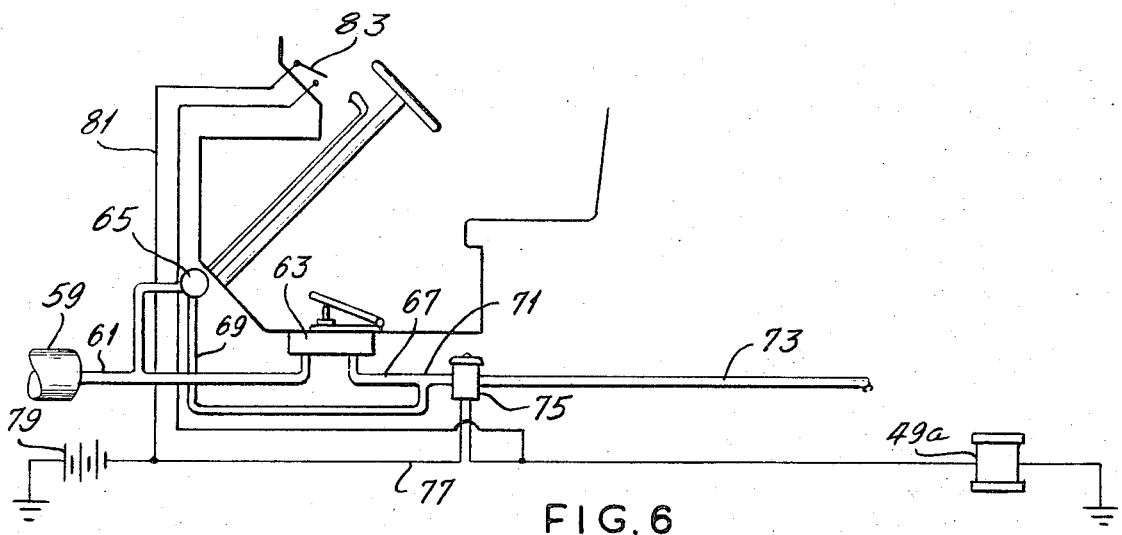
FIG. 6 is a schematic view of the control system.

In FIGS. 1 and 2 a motor vehicle comprising a highway tractor 1 is coupled by means of a fifth wheel 3 to a semitrailer vehicle 5, such that the forward end of the body of semitrailer vehicle 5 rests on tractor fifth wheel assembly 3 and is freely pivoted therewith about the vertical axis of fifth wheel pivot pin 4 to provide articulation of the two vehicles for operation around curves. Fifth wheel assembly 3 may comprise a base plate 7 secured to the tractor underframe, a turntable 9 rotatably seated on base plate 7 for rotation about pin 4. Turntable 9 mounts upstanding transversely spaced trunnion brackets 11 and fifth wheel 13 is formed with corresponding depending brackets. Brackets 11 and 15 are connected by transverse trunnion pin 17 to permit necessary tilting of fifth wheel 13. The latter is of the usual form, having a radial rearwardly extending slot to lockably receive a trailer king pin 21. On both sides of slot 19, fifth wheel 13 is slotted at 23 to mount upwardly pointed dogs, which are biased upwardly by flat springs 27 into engagement with corresponding slots 29 in the trailer underframe, so as to hold the fifth wheel 13 against rotation with respect to trailer 5, rotation of trailer 5 with respect to tractor 1 being accommodated by swivel of turntable 9 on base plate 7.

While such vehicle combinations have numerous well-known advantages, one serious disadvantage of their articulation is the possibility of their jackknifing; i.e., exceeding their normal maximum angle of connection to each other, which is about 94° such that in some instances the trailer crushes or shears off the tractor cab with serious injury and frequently death to the driver and other occupants of the cab, in addition to property damage to both the tractor and the semi-trailer.

Tp prevent jackknifing, a normally longitudinally extending variable length link 31 is pivotally secured at its forward end at 33 to the underframe of tractor 1 a substantial distance forwardly of the pivot center of fifth wheel 13, and is pivotally secured at its rear end at 35 to structure rotatable with the semitrailer 5, preferably to fifth wheel 13, such that any pivotal movements of semitrailer 5 about fifth wheel pivot pin 4 away from the straight-line position are accompanied by decreases in the length of link 31.

To prevent undesired turning and hence jackknifing, without interfering with return of the tractor and semi-trailer vehicles to their normal aligned positions, link 31 incorporates a device 37 for selectively locking link 31 in any extended position while leaving link 31 free to contract to its normal straight line length.

Device 37 comprises a cylinder 39 rigid with the forward end 41 of link 31 and a position 43 slidable with cylinder 39 and having its rod 45 extending from the rear end of link 31. A normally open bypass conduit 47 connects opposite ends of cylinder 39 and the cylinder and conduit are normally filled with liquid. To prevent lengthening of link 31 under potential jackknifing conditions, a normally open solenoid controlled valve 49 is positioned in conduit 47 for blocking the conduit and preventing the flow of liquid from the rear to the forward side of piston 43 when the solenoid is energized and thus preventing further swivel of the trailer and tractor with respect to each other. To facilitate return of the coupled vehicle to its aligned position even when valve 49 is closed, piston 43 includes one or more ports in which are located ball check valves 53, which are biased by springs 55 into sealing engagement with seats 57 in the forward face of piston 43 so as to permit fluid forward of piston 43 to pass through ports 51 and thus facilitate forward movement of the piston, while preventing fluid rearward of the piston from passing through ports 51.

During normal operation, with solenoid valve 49 de-energized, piston 43 is free to move rearwardly in cylinder 39 thus providing correspondingly free elongation of link 31 and relative pivotal movements of tractor 1 and semitrailer 5 about fifth wheel pin 4. Upon energization of solenoid valve 49, however, piston 43 is held against further rearward movement, and any tendency of the tractor and semitrailer to pivot relative to each other in either direction and eventually jackknife will apply tension to link 31 which, by its resistance to tension, will oppose any such tendency and thus prevent jackknifing.

For closing solenoid valve 49, it is preferably connected by means comprising line 77 to the brake system, which comprises a tractor-mounted air reservoir 59 connected to supply line 61.

For operating the brakes, supply line 61 is connected separately to the usual pedal-operated brake valve 63 and hand valve 65, and outlets 67 and 69 of valves 63 and 65 are connected at 71 to trailer control line 73. The latter includes a normally open pressure-responsive switch 75 posterior to the convergence at 71 of lines 67 and 69. Switch 75 is in an electrical conductor 77 leading from battery 79 to solenoid 49a of valve 49, so that when the trailer brakes are applied, either by pedal-operated valve 63 or hand valve 65 and pressure in line 73 and switch 75 reaches a predetermined value, switch 75 closes and causes current to flow from battery through line 77 to energize solenoid 49a, closing valve 49 and preventing additional swiveling of the trailer about fifth wheel pivot pin 4.

To permit operating of the antijackknifing device at other times independently of the brake system when in the judgment of the driver it is desirable so to do, a shunt conductor 81, including a dashboard-mounted normally open switch 83, bypasses pressure-responsive switch 75, thus permitting the operator to close solenoid valve 49a without actuating the brakes.

Operation of the device is as follows: When the driver makes a brake application, either with foot valve 63 or hand valve 65, switch 75 closes to energize solenoid 49a (which he may also energize by closing switch 83, without making any brake application). Solenoid 49a closes valve 49, thus preventing flow of liquid from the rear to forward end of cylinder 39, whereby to prevent rearward movement of piston 43 and extension of link 31. This will resist further swivel of the trailer with respect to the tractor which might result in jackknifing. If, however, the tractor and trailer begin to return to aligned position even with valve 49 closed, forward movement of the piston and the necessary shortening of link 31 will be facilitated by the passage of fluid forward of the piston through valved ports 51 in the piston, and there will accordingly be no substantial resistance to return of the tractor and trailer to aligned relationship.

Figure 7:
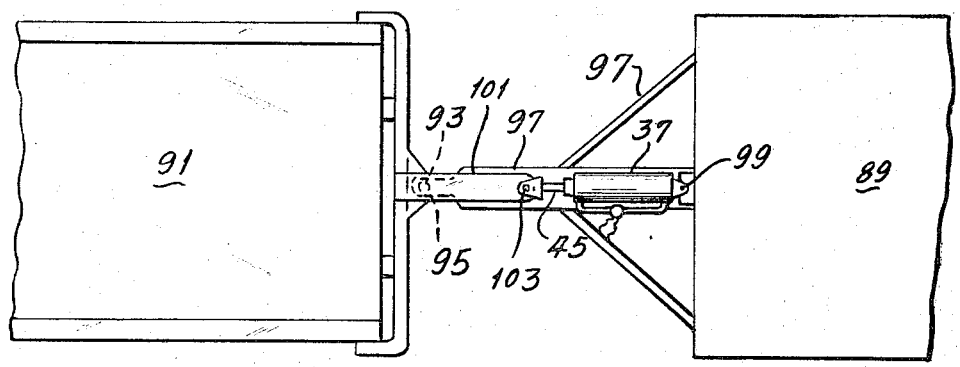
FIG. 7 is a plan view of adjacent portions of a combination vehicle comprising a truck and self-supporting trailer on a straight course.
Figure 8:
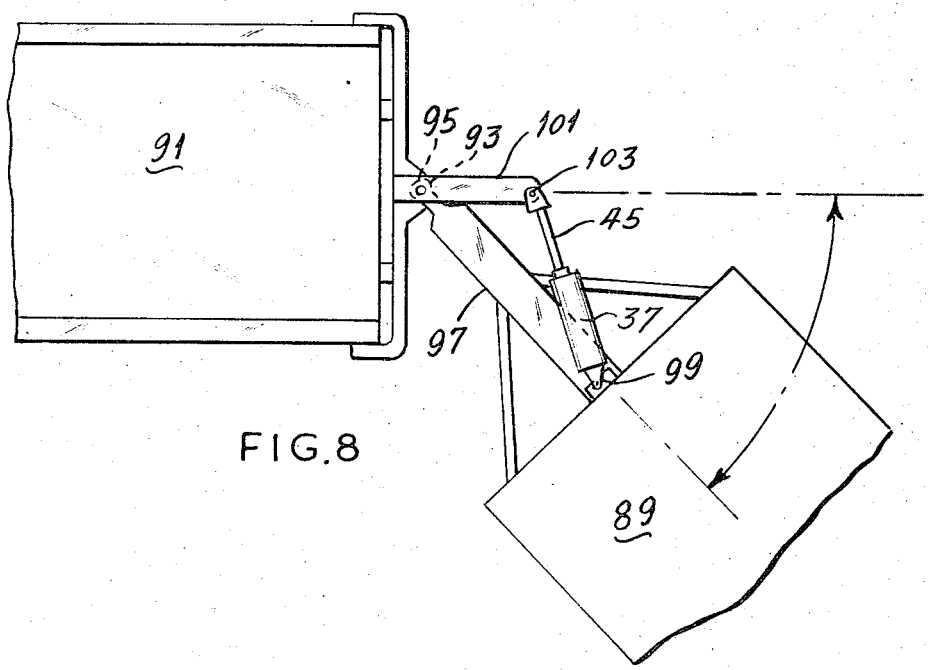
FIG. 8 is a plan view showing the combination vehicle of FIG. 7 on a turn.

Application of the antijackknifing device to a vehicle combination of the type in which the trail vehicle is a separate trailer 89 principally supported on its own wheels is shown in FIGS. 7 and 8, in which the numeral 91 indicates a truck, mounting on its rear end a ball-type coupling 93, to which is pivotally secured the socket-type coupling 95 mounted on the forward end of tongue 97 of trailer 89.

The antijackknifing device of FIGS. 7 and 8 is generally similar to that of FIGS. 1-3, comprising a longitudinally extending variable length link 31 pivotally connected at its rear end at 99 to trailer 89. Truck 91 is provided at its rear end with a rearwardly extending horizontal bracket 101 overlying coupling 93, 95 and vertically clearing the same, and the forward end of link 31 is pivotally connected at 103, rearwardly of coupling 93, 95, to bracket 101.

Operation of the antijackknifing device illustrated in FIGS. 7 and 8 is substantially the same as that of the embodiment of FIGS. 1-3.

The invention may be modified in various respects as will occur to those skilled in the art and the exclusive use of all modifications as come within the scope of the appended claims is contemplated.

We claim:

1. In a motor and trailer vehicle combination comprising a motor vehicle and a trail vehicle, means coupling said vehicles to each other for relative pivotal movements in the horizontal plane, an antijackknifing device comprising a variable length link connected at its opposite ends to said respective vehicles at points spaced from the pivotal axis of said coupling means whereby movement of said vehicles from aligned relation with each other changes the length of said link, means for selectively locking said link against changes in length, said link being arranged such that relative movements of said vehicles away from aligned relationship causes changes in the length of said link in one direction and relative movements of said vehicles toward aligned relationship causes changes in the length of said link in the opposite direction, and means independent of said locking means to facilitate changes in the length of said link solely in said opposite direction and thereby facilitate return movements of said vehicles toward aligned relationship though said locking means remains locked.

2. In a vehicle combination according to claim 1, means for selectively actuating said locking means.

3. In a vehicle combination according to claim 2 having vehicle brakes, means for selectively applying said vehicle brakes, said actuating means including means responsive to said selective brake-applying means.

4. In a vehicle combination according to claim 3, said actuating means including means independent of said selective brake-applying means for selectively energizing said anti-jackknifing braking element.

5. In a vehicle combination according to claim 1, said link comprising a fluid filled cylinder and a piston longitudinally movable therein, normally open conduit means connecting opposite ends of said cylinder, said locking means comprising a normally open valve in said conduit means, and means for selectively closing said valve.

6. In a vehicle combination according to claim 5, said piston being movable in one direction responsive to relative movements of said vehicles about the axis of the coupling away from aligned relationship, and in the opposite direction responsive to their relative movements toward aligned relationship, said facilitating means comprising check valve means in said piston constructed to facilitate movements of said piston solely in said opposite direction when said normally open valve is closed and thereby facilitate return of said vehicles to their normal aligned relationship.

7. In a vehicle combination according to claim 6, said means for selectively closing said valve comprising a solenoid, a source of electric power, a conductor connecting said source and said solenoid and including normally open switch means.

8. In a motor and trailer vehicle combination comprising a motor vehicle and a trail vehicle, means coupling said vehicles to each other for relative pivotal movements in the horizontal plane, an antijackknifing device comprising a variable length link connected at its opposite ends to said respective vehicles at points spaced from the pivotal axis of said coupling means whereby movement of said vehicles from aligned relation with each other changes the length of said link, means for selectively locking said link against changes in length, said link comprising a fluid filled cylinder and a piston longitudinally movable therein, normally open conduit means connecting opposite ends of said cylinder, said locking means comprising a normally open valve in said conduit means, means for selectively closing said valve, said means for selectively closing said valve comprising a solenoid, a source of electric power, a conductor connecting said source and said solenoid and including normally open switch means, vehicle brakes, and means for selectively applying said brakes, said switch means being closable responsive to applications of said brakes.

9. In a vehicle combination according to claim 1, said motor vehicle comprising a tractor and said trail vehicle comprising a semitrailer pivotally supported on the rear portion of said tractor for pivotal movement with respect thereto about a vertical axis.

10. In a motor and trailer vehicle combination comprising a motor vehicle and a trail vehicle, means coupling said vehicles to each other for relative pivotal movements in a horizontal plane, an antijackknifing device comprising a variable length link connected at its opposite ends to said respective vehicles at points spaced from the pivotal axis of said coupling means whereby movement of said vehicles from aligned relation with each other changes the length of said link, means for selectively locking said link against changes in length, said motor vehicle comprising a tractor and said trail vehicle comprising a semitrailer pivotally supported on the rear portion of said tractor for pivotal movement with respect thereto about a vertical axis, said coupling means comprising a fifth wheel rotatably mounted on said tractor and held against rotation with respect to said trailer, said fifth wheel having means forming the pivotal connection of said link to said trailer.

11. In a vehicle combination according to claim 1, said trail vehicle being a separate trailer having a rigid forwardly extending tongue, said coupling comprising mating pivot members on the forward end of said tongue and the rear end of said motor vehicle, said variable length link being connected to said motor vehicle rearwardly of said coupling and having its axis normally aligned longitudinally of the vehicle with said pivot members.

* * * * *